United States Patent [19]

Kamei

[11] Patent Number: 4,739,422
[45] Date of Patent: Apr. 19, 1988

[54] MAGNETIC RECORDING APPARATUS

[75] Inventor: Masaru Kamei, Tokyo, Japan

[73] Assignee: Tokyo Electric Co., Ltd., Tokyo, Japan

[21] Appl. No.: 825,995

[22] Filed: Feb. 4, 1986

[30] Foreign Application Priority Data

Feb. 26, 1985 [JP] Japan .................. 60-36955

[51] Int. Cl.$^4$ .................. G11B 5/52; G11B 19/00; G11B 5/012; G11B 5/55
[52] U.S. Cl. .................. 360/86; 360/97; 360/106; 360/109; 360/73; 360/74.1; 360/75
[58] Field of Search .................. 360/86, 106, 105, 109, 360/97–99, 75, 107, 74.1, 73

[56] References Cited

U.S. PATENT DOCUMENTS

| 3,046,357 | 7/1962 | Fujimoto | 360/86 |
| 3,060,940 | 10/1962 | Fujimoto | 360/86 |
| 3,855,620 | 12/1974 | Kato | 360/107 |
| 3,922,717 | 11/1975 | Zimmerman | 360/86 |
| 4,131,923 | 12/1978 | Wachs et al. | 360/109 |
| 4,314,292 | 2/1982 | Umaba | 360/86 |
| 4,641,209 | 2/1987 | Smith, II | 360/107 |

FOREIGN PATENT DOCUMENTS

| 0049946 | 4/1982 | European Pat. Off. | 360/106 |
| 0071381 | 2/1983 | European Pat. Off. | 360/106 |
| 58-175168 | 10/1983 | Japan | 360/86 |

OTHER PUBLICATIONS

Porter et al., "Disk Drive with Synchronous Head Tracking," IBM Technical Disclosure Bulletin, vol. 18, No. 11, Apr. 1976, pp. 3769-3770.
Castrodale et al., "Magnetic Head Band Access Mechanism," IBM Technical Disclosure Bulletin, vol. 17, No. 1, Jun. 1974, pp. 196-197.

*Primary Examiner*—John H. Wolff
*Assistant Examiner*—Matthew J. Bussan
*Attorney, Agent, or Firm*—Oblon, Fisher, Spivak, McClelland & Maier

[57] ABSTRACT

A magnetic recording apparatus including a base, a drive shaft mounted on the base for rotating a magnetic disc, a movable member adapted to reciprocate in a radial direction of the magnetic disc while holding a magnetic head, the movable member being urged in a first direction; a motor; a gear reduction mechanism including a plurality of gears wherein the plurality of gears and the drive shaft are connected to the motor wherein the rotational direction of the motor is controlled in either forward or reverse operation selectively; a support portion; and a belt mechanism for pulling said movable member in a direction opposite the first direction, one end of the belt being connected to a rotation output portion of the reduction mechanism, an intermediate part of the belt mechanism engaging the movable member and an opposite end of the belt mechanism being fixed to the support portion such that accurate tracking action is attained.

4 Claims, 4 Drawing Sheets

MAGNETIC RECORDING APPARATUS

FIELD OF THE INVENTION

The present invention relates to a magnetic recording apparatus for recording or reproducing information by allowing a magnetic head to trace a rotating magnetic disc in a vortex form.

DESCRIPTION OF THE PRIOR ART

According to a conventional magnetic recording apparatus of this type, a magnetic disc is rotated by a single motor adapted to rotate in one direction and at the same time a movable member which holds a magnetic head is moved in a radial direction of the magnetic disc.

As drive means for the movable member, the movable member is formed with a sector gear having a radial center corresponding to a pivoting fulcrum of the movable member, and a drive gear having teeth formed partially on an outer periphery thereof which are in mesh with the sector gear, is connected to a motor through a number of reduction gears to urge the movable member in one direction.

The drive gear is rotated always in one direction to turn the movable member in one direction, and when the teeth of the drive gear are disengaged from the sector gear, the movable member returns in an opposite direction by virtue of a biasing force, and this operation is repeated. But every time the movable member reciprocates once, the meshing positions of the teeth of the sector gear, drive gear and reduction gears change inevitably. Even in a single gear, it is extremely difficult to finish a large number of teeth on the outer periphery into a uniform size. Particularly, the gears used in this field are in many cases formed from plastics for the reduction of cost, thus resulting in the fact that the dimensional accuracy is deteriorated and a dimensional change caused by a rise of temperature is not negligible. Consequently, every time the movable member which holds a magnetic head is reciprocated once, its position relative to a track on the magnetic disc changes and thus there arises the so-called off-track problem.

SUMMARY OF THE INVENTION

It is a first object of the present invention to assuredly prevent the occurrence of off-track problems.

It is a second object of the present invention to interconnect a reduction mechanism and a movable member in a simple manner using a steel belt.

It is a third object of the present invention to determine a home position of a movable member accurately and easily.

It is a fourth object of the present invention to effect return to the home position at high speed to shorten an idle time.

According to the present invention, there are used a drive shaft for rotating a magnetic disc and a movable member adapted to reciprocate in a radial direction of the magnetic disc while holding a magnetic head, and an output side of a reduction mechanism including a plurality of gears connected to the movable member, while an input side of the reduction mechanism as well as the drive shaft are connected to a motor whose rotating direction is controlled either in a forward or reverse direction selectively. The movable member is pivoted first rotating the motor forward at a certain rotational angle and then rotating it in reverse. During this operation, the meshing range of gears is kept constant. Therefore, once the position of the movable member relative to the magnetic disc is adjusted, the home position of the movable member and the operation range thereof are maintained constant no matter how many times the movable member may be reciprocated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
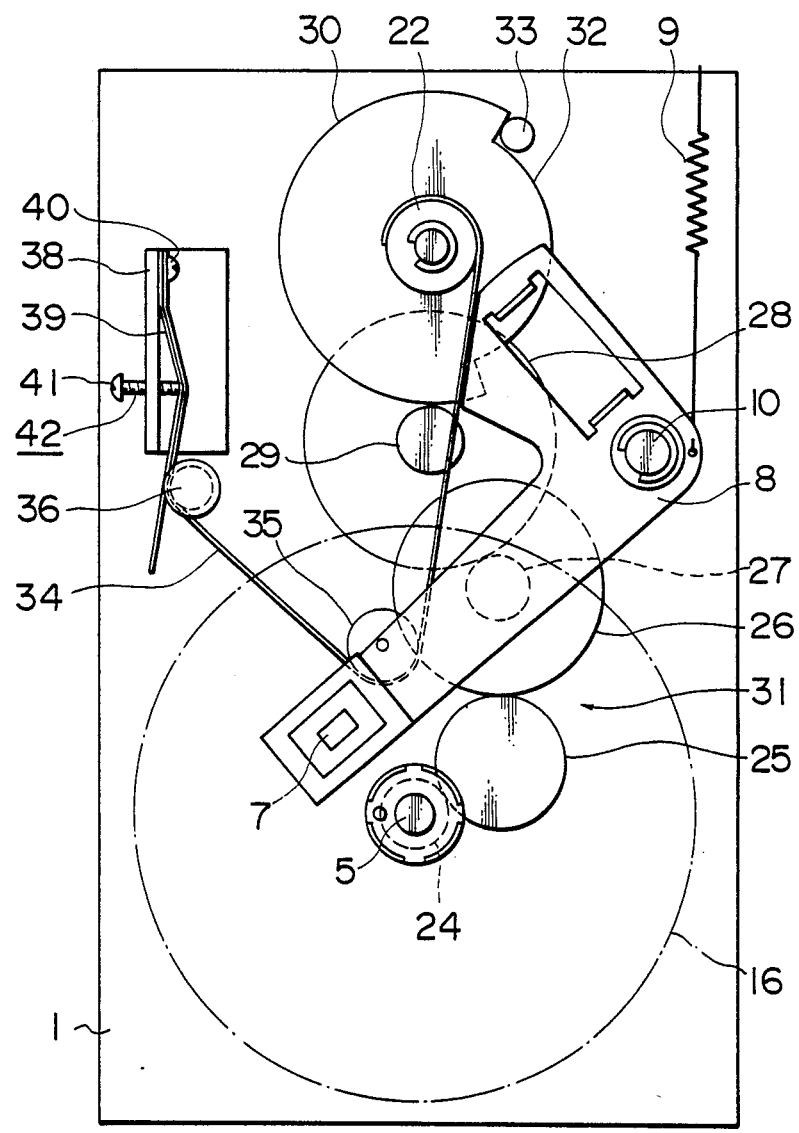
FIG. 1 is a plan view showing a connection structure between a movable member and a reduction mechanism.
Figure 2:
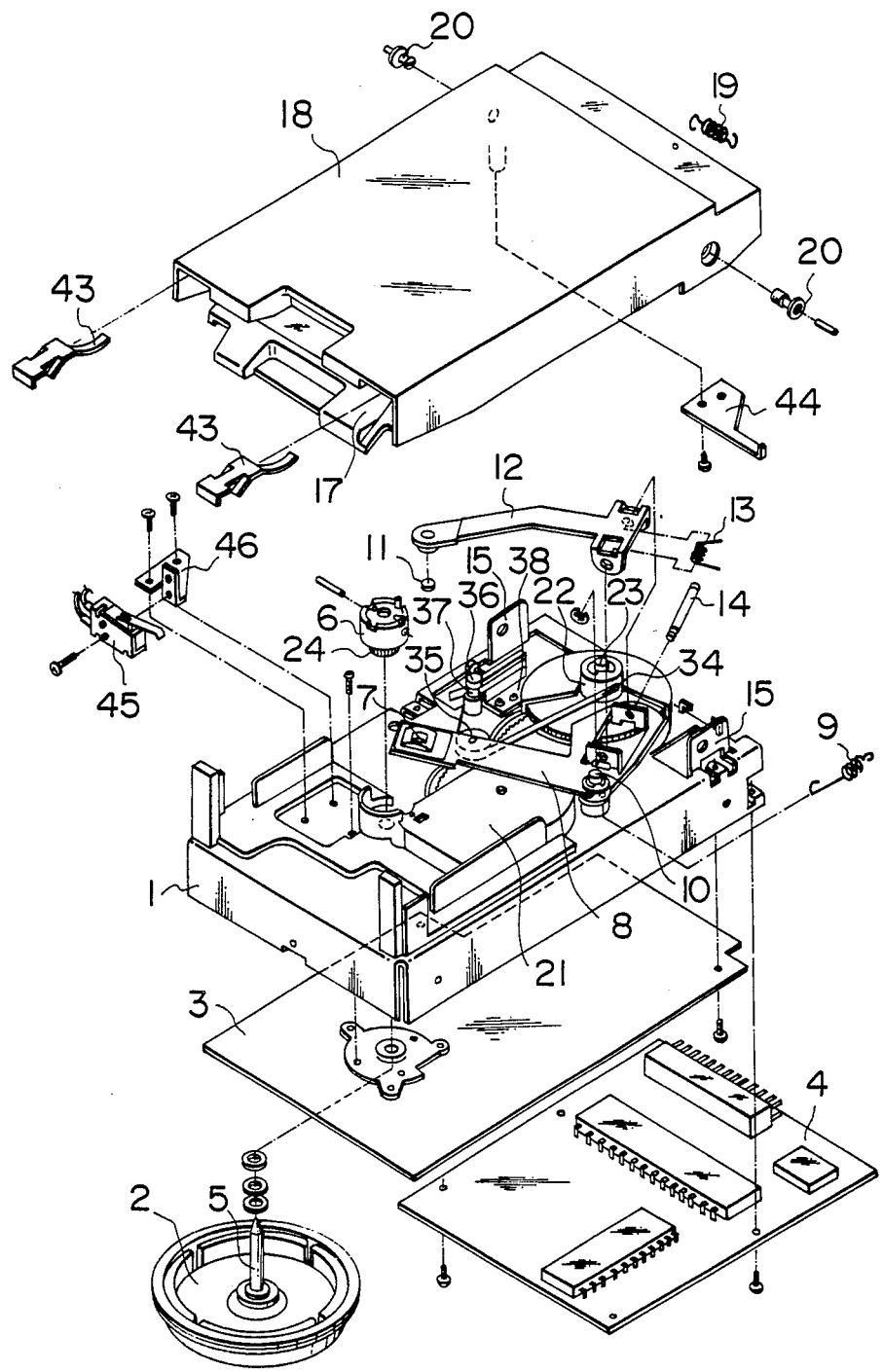
FIG. 2 is an exploded perspective view on a contracted scale.
Figure 3:
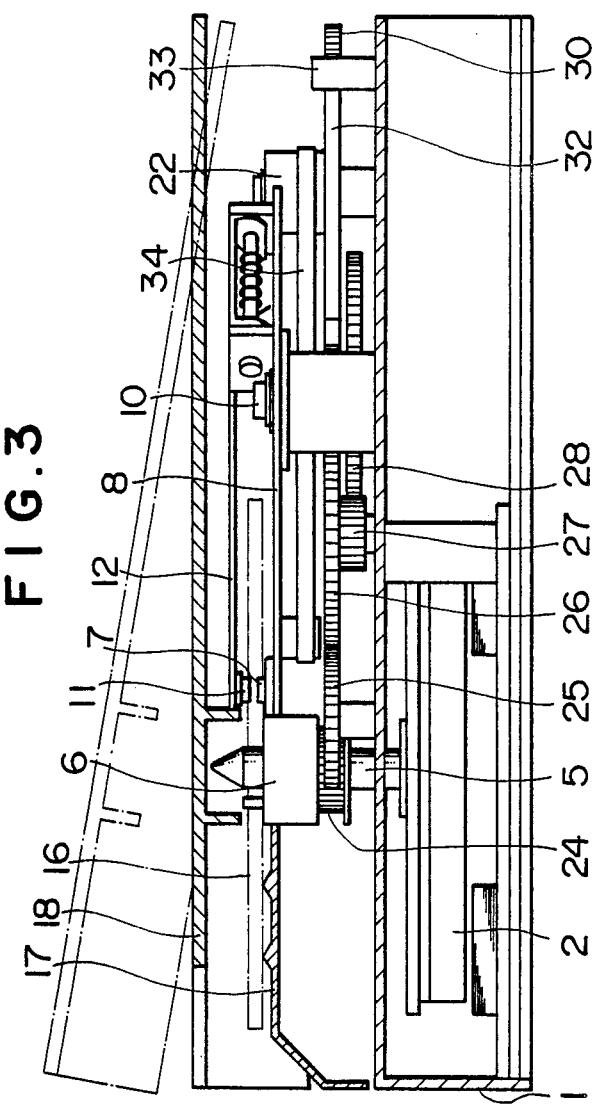
FIG. 3 is a side view of a longitudinal section.

An embodiment of the present invention will now be described with reference to FIGS. 1 to 4. Numeral 1 denotes a base. To the base 1 are attached a substrate 3 which holds a motor 2 as well as a PC plate 4, the motor 2 being controlled its rotational direction in either forward or reverse, selectively. A drive shaft 5 directly coupled to the motor 2 projects from the base 1 and to this projecting end is fixed disc holder 6. Further, a movable member 8 which holds a magnetic head 7 is supported on the base 1 through a shaft 10 while being urged in a counterclockwise direction by means of a spring 9. A pressing arm 12 which holds a pad 11 is connected to the movable member 8 while being urged toward the movable member by means of a spring 13, the pressing arm 12 being capable of being raised and lowered through a shaft 14. Projecting pieces 15 are formed on both rear side portions of the base 1 and a cover 18 having a support portion 17 for supporting a magnetic disc 16 is attached to the projecting pieces 15 pivotably through hinges 20 while being urged toward the base 1 by means of a spring 19.

Moreover, a gear case 21 is fixed to the base 1, with a support shaft 23 being erected on an end portion of the gear case 21, the support shaft 23 supporting a drive pulley 22 rotatably. Integral with the disc holder 6 is a gear 24, and a plurality of gears 25, 26, 27, 28, 29 and 30 for transmitting the rotation of the gear 24 successively to the drive pulley 22 are housed in the gear case 21. The gears 24-30 constitute a reduction mechanism 31. Further, a notch 32 is formed in part of the outer periphery of the gear 30 and a stopper 33 positioned in the notch 32 is erected on the base 1. A steel belt 34, which is fixed at one end to the drive pulley 22, is bent in the form of a V by movably engaging a pulley 35 fixed to the movable member 8, then it is passed through a groove 37 of a pin 36 erected on the base 1, and further its fore end portion is fixed to a support plate 38 together with a plate spring 39 by means of a bolt 40, the support plate 38 being fixed to the base 1. An adjusting screw 41 is threadedly fitted through the support plate 38 to push the plate spring 39. The plate spring 39 and the adjusting screw 41 constitute an adjusting mechanism 42 for changing an effective length of the steel belt 34 between the drive pulley 22 and the pin 36.

Further, fixed to the cover 18 are plate springs 43 for pressing both sides of a flat hard case (not shown) which contains the magnetic disc 16, and a plate 44 for retracting the pressing arm 12 from the magnetic disc 16 at the time of opening motion of the cover 18. A switch 45 for detecting opening and closing motions of the cover 18 is attached to the base 1 through a bracket 46.

Figure 4:
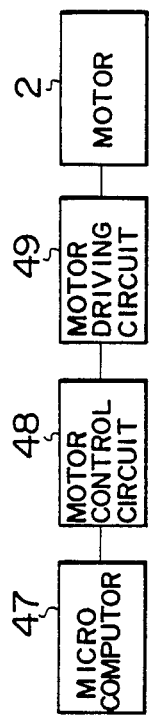
FIG. 4 is a block diagram showing a motor driving circuit.

As shown in FIG. 4, a microcomputer 47, a motor control circuit 48 and a motor driving circuit 49 for the motor 2 are connected successively and are held by the PC plate.

In such construction, when the motor 2 is rotated forward, the magnetic disc 16 and the drive pulley 22 rotate in a counterclockwise direction and the steel belt 34 is pulled by the drive pulley 22, so that the movable member 8 pivots clockwise about the shaft 10, while there is performed information recording or playback. Upon a reverse rotation of the motor 2, the drive pulley 22 rotates clockwise to loosen the steel belt 34, the movable member 8 pivots counterclockwise by virtue of the spring 9, and the magnetic head 7 returns to its home position on an inner periphery side of the magnetic disc 16. During one reciprocation of the movable member 8, all the power transfer members repeat forward and reverse rotations, so the meshing range of teeth of the gears 24–30 is constant no matter how many times the movable member 8 may be reciprocated. Consequently, the home position and moving range of the movable member 8 are always constant and so it is possible to prevent the occurrence of the off-track problem. The same function may be obtained by using a gear in place of the drive pulley 22 and forming on the movable member 8 a sector gear which engages said gear. Adjustment of the home position of the magnetic head 7 at the time of assembly is easily effected by turning the adjusting screw 41 and thereby changing an effective length of the steel belt 34 between the pin 36 and the drive pulley 34. The steel belt 34 will never be damaged because it undergoes the pressure of the adjust spring 41 through the plate spring 39, nor will it be disengaged from the groove 37 of the pin 36 because it is pressed by the plate spring 39.

Since the steel belt 34 is bent by the pulley 35, the amount of movement of the movable member 8 can be reduced by half relative to the length pulled by the drive pulley 22. That is, the steel belt 34 also exhibits a speed reducing action for the power transfer path. An accurate tracking operation can be attained by moving the movable member 8 slightly.

The microcomputer 47 provides a forward/reverse change-over signal for the motor 2 in accordance with operation by an operator and the motor control circuit 48, upon receipt of this signal, controls the motor driving circuit 49 to rotate the motor 2 at a speed suitable for recording or reproducing of information if the rotation is forward, while if the signal indicates reverse rotation, the motor 2 is rotated at high speed to effect shortening of time.

In the event of malfunctioning of the operation controlling microcomputer 47 and the motor 2 failing to stop, the stopper 33 positioned in the notch 32 stops overrunning of the gear 30 forcibly. Therefore, no load is imposed on the movable member 8 and there will be neither elongation or breakage of the steel belt 34 nor dislocation of the adjusted home position of the movable member 8.

Figure 5:
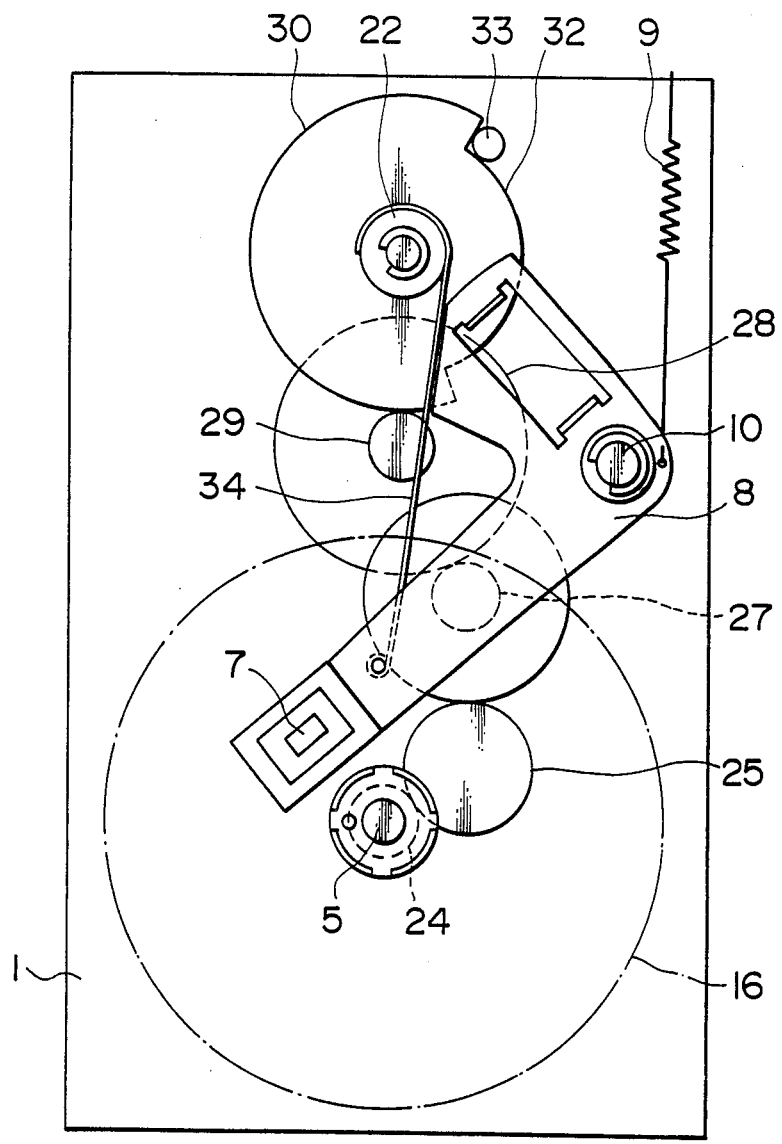
FIG. 5 is a plan view showing a modification of a movable member - reduction mechanism connecting structure.

As shown in FIG. 5, both ends of the steel belt 34 may be fixed to the drive pulley 22 and the movable member 8 respectively. Also in this case, the amount of movement of the movable member 8 can be reduced by half relative to the pulled length of the steel belt 34 by enlarging the angle of the steel belt relative to the moving path of the magnetic head 7.

Obviously, numerous modifications and variations of the present invention are possible in light of the above teachings. It is therefore to be understood that within the scope of the appended claims, the invention may be practiced otherwise than as specifically described herein.

I claim:

1. A magnetic recording apparatus including a base; a drive shaft mounted on said base for rotating a magnetic disc; a movable member adapted to pivot in a radial direction of said magnetic disc while holding a magnetic head, said movable member being urged in a first direction; a motor; a gear reduction mechanism including a plurality of gears wherein said plurality of gears and said drive shaft are connected to said motor and wherein the rotational direction of said motor is controlled in either forward or reverse operation selectively; a support portion; and belt means for pulling said movable member in a direction opposite said first direction, one end of said belt means being connected to a rotation output portion of said reduction mechanism, an intermediate part of said belt means movably engaging said movable member for selectively pivoting said movable member and an opposite end of said belt means being fixed to said support portion such that accurate tracking action is attained.

2. A magnetic recording apparatus including a base; a motor mounted on said base; a drive shaft mounted on said base for rotating a magnetic disc; a movable member adapted to reciprocate in a radial direction of said magnetic disc while holding a magnetic head, said movable member being urged in a first direction; a gear reduction mechanism including a plurality of gears wherein an input side of said reduction mechanism and said drive shaft are connected to said motor wherein the rotational direction of said motor is controlled in either forward or reverse operation, selectively; a support portion mounted on said base; belt means for pulling said movable member opposite said first direction, one end of said belt means being connected to a rotation output portion of said reduction mechanism, an intermediate part of said belt means movably engaging said movable member and an opposite end of said belt means being fixed to said support portion; and an adjusting mechanism comprising a plate spring and an adjusting screw, said plate spring being fixed at one end thereof to said support portion to press said belt means against said support portion, said adjusting screw being threadly fitted through said support portion to press and bend said plate spring between said support portion and the fixed end of said plate spring such that accurate tracking action is attained.

3. A magnetic recording apparatus according to claim 1, further comprising a rotating member located in a rotation transfer path of said reduction mechanism and a stopper for restricting rotation of said rotating member.

4. A magnetic recording apparatus according to claim 1, further comprising a microcomputer which provides a forward/reverse change-over signal in accordance with a change in rotational direction of said motor, and a motor control circuit which receives the forward/reverse change-over signal from said microcomputer and controls the rotating speed of said motor in accordance with said signal.

* * * * *